UNITED STATES PATENT OFFICE.

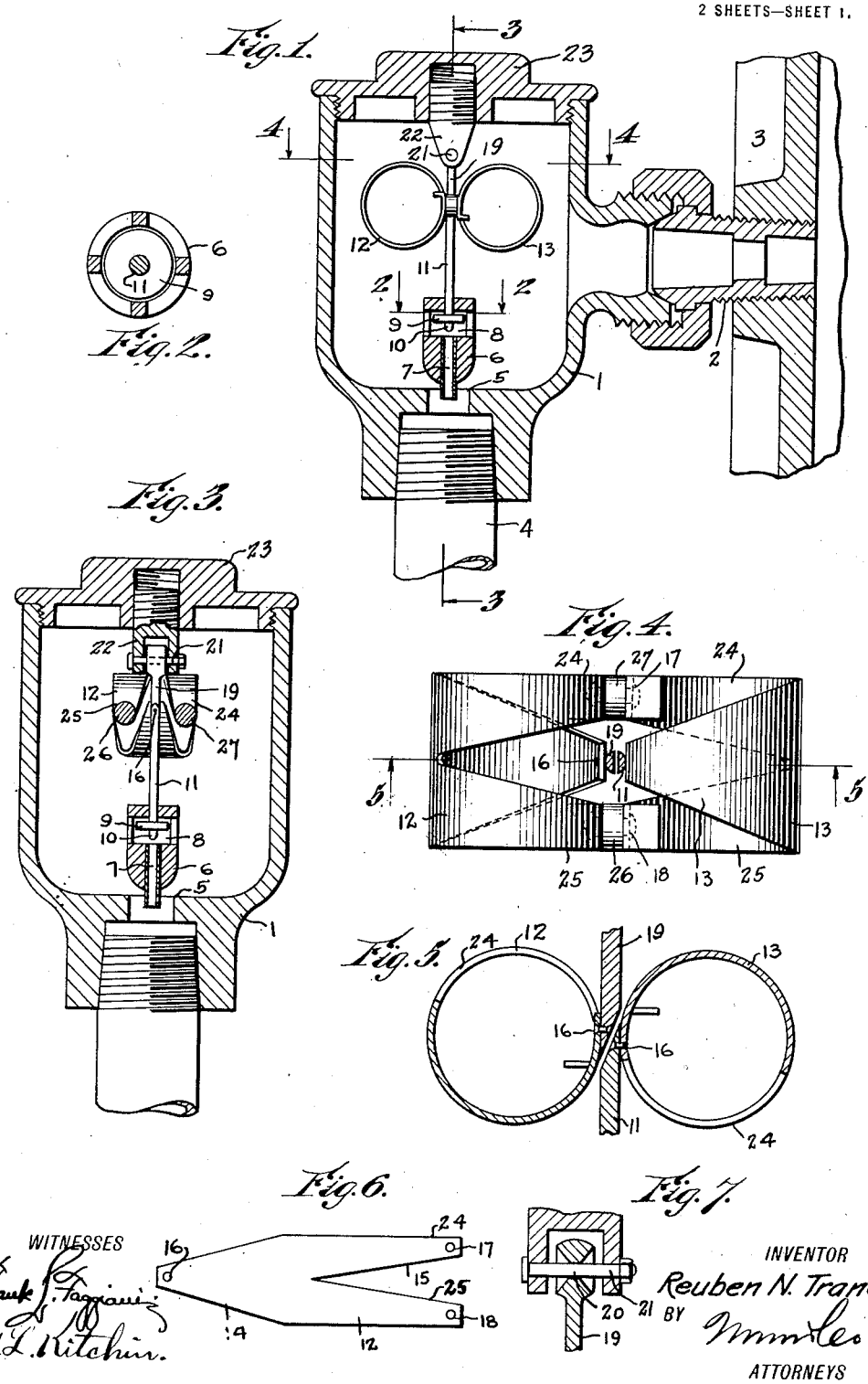

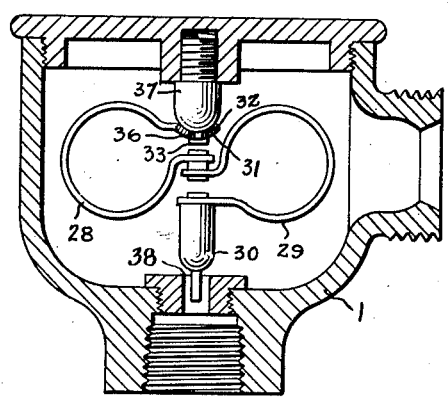
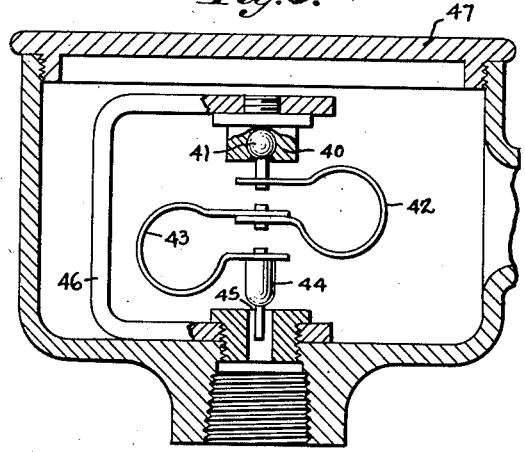
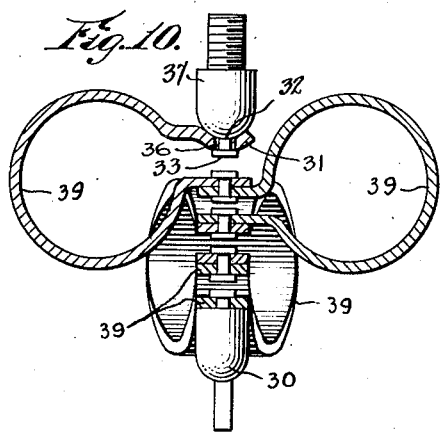
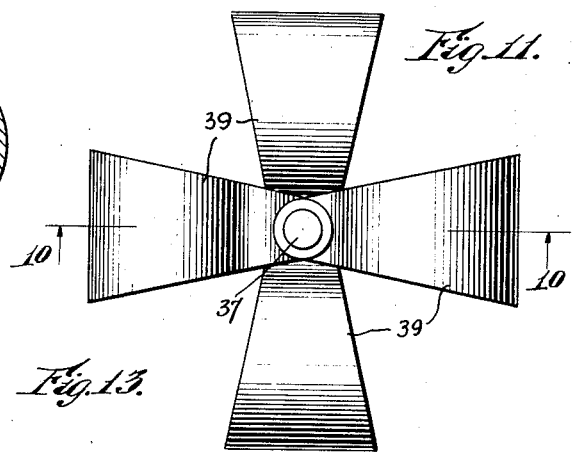
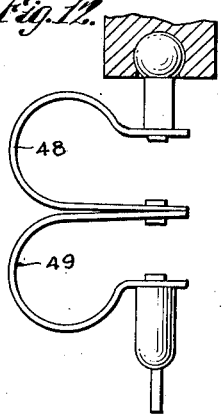
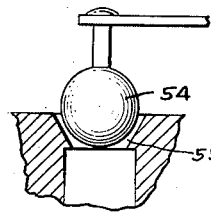
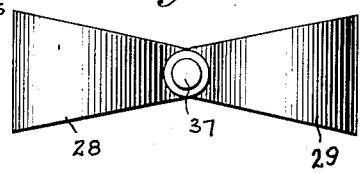
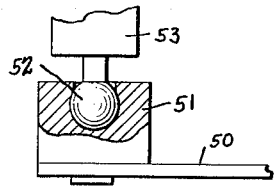

REUBEN N. TRANE, OF LA CROSSE, WISCONSIN.

THERMOSTATIC TRAP.

1,395,167.  Specification of Letters Patent.  Patented Oct. 25, 1921.

Application filed January 25, 1919. Serial No. 273,085.

*To all whom it may concern:*

Be it known that I, REUBEN N. TRANE, a citizen of the United States, and a resident of La Crosse, in the county of La Crosse and State of Wisconsin, have invented a new and Improved Thermostatic Trap, of which the following is a full, clear, and exact description.

This invention relates to thermostatic valves or traps for radiators, or other steam appliances and has for an object the provision of an improved construction which will be both sensitive and powerful.

Another object in view is to provide a thermostatic trap with a thermostatic structure formed of one or more circular members acting on the valve for opening and closing the same.

A further object of the invention is to provide a thermostatic trap with thermostatic members, each in the blank representing in shape a spear head, or fork.

Another object of the invention is to provide a trap with a thermostatic member for opening and closing the valve and a double valve structure formed with a comparatively large heavy valve for taking care of high pressures, and a small valve forming part of the head of the valve whereby the structure is sensitive to small changes in temperature as well as active in connection with high pressure.

Another object of the invention is to provide a thermostatic trap in which the thermostatic member is mounted so as to have a substantially free annular movement which will not affect its up and down movement.

In the accompanying drawings:

Figure 1 is a longitudinal vertical section through a thermostatic valve embodying the invention, same being shown applied.

Fig. 2 is a fragmentary transverse sectional view through Fig. 1 on line 2—2, the same being on an enlarged scale.

Fig. 3 is a sectional view through Fig. 1 approximately on line 3—3.

Fig. 4 is a top plan view of the thermostatic member shown in Fig. 1, the same being on an enlarged scale.

Fig. 5 is a longitudinal vertical section through Fig. 4 on line 5—5.

Fig. 6 is a plan view of a blank disclosing the same structure as one of the members shown in Fig. 4.

Fig. 7 is a detail fragmentary sectional view showing a slightly modified form of mounting for the thermostatic members.

Fig. 8 is a view similar to Fig. 1, but disclosing a slightly modified form of the invention.

Fig. 9 is a further modified form of the invention to that shown in Fig. 8.

Fig. 10 is a sectional view through Fig. 11 on line 10—10.

Fig. 11 is a top plan view of the thermostatic member shown in Fig. 10.

Fig. 12 is another form of the invention to that shown in Fig. 8, the same disclosing the ball and socket shown in Fig. 9.

Fig. 13 is a fragmentary sectional view showing a modified arrangement of valve seat from that disclosed in Fig. 8.

Fig. 14 is a fragmentary sectional view showing a modified arrangement of the connection of a thermostatic member to a stationary support.

Fig. 15 is a top plan view of the thermostatic member shown in Fig. 8.

Referring to the accompanying drawings by numerals 1 indicates a casing of a thermostatic valve which is provided with a connecting member 2 for connecting the valve to a radiator 3. A return pipe 4 is threaded into the lower part of the casing 1 so that air and water may flow freely from the radiator. The casing 1 is provided with a valve seat 5 for receiving valve member 6 whenever an appreciable amount of steam passes through the casing. The valve member 6 is provided with a tubular extension 7 opening into a cut out portion 8 in the valve member, said cut out portion carrying a disk 9 or rounded projection 10 for fitting into the upper end of the tubular member 7 so as to close the same when the rod 11 is moved downwardly a sufficient distance. As steam begins to pass through the casing 1 the thermostatic members 12 and 13 will become heated and will expand so that the valve member 6 is lowered until it engages the seat 5. The rod 11 continues to move downwardly as the thermostatic members are heated until the rounded auxiliary valve member or projection 10 is fitting tightly in the end of the tubular member 7, whereupon the steam cannot pass. As soon as the parts become slightly cooler the valve members 12 and 13 will contract and will first raise rod 11 together with the auxiliary valve member 10 so that there will be assumed an equilibrium of pressure on the large valve 6, by reason of the passageway provided by the tubular member 7. This will permit the thermostatic members 12 and 13 to easily raise the large valve member even though the device is operating with comparatively high steam pressure.

The particular construction and arrangement of the thermostatic members 12 and 13 and associate parts are shown in Figs. 4 to 6 inclusive, wherein it will be seen the thermostatic members 12 and 13 are circular each being bent into the form of an open cylinder and when first formed from the blank represent an arrow head or a fork in which the members 12 and 13 form the prongs and the part 14 the "handle" as illustrated in Fig. 6. This produces the same strength as a rectangular structure would and saves an appreciable amount of material as the pointed end or handle 14 of one member is removed from the V-shaped cut 15 of the next adjacent part. Suitable apertures 16, 17 and 18 are provided for receiving rivets for connecting the thermostatic members together and to the respective rods 11 and 19. Rod 19 is pivotally mounted on a pivotal pin 21 which is journaled in the bifurcated end of a threaded member 22 which is screwed into the cap 23 of the casing 1. This arrangement allows the parts to be properly adjusted before the cap 23 is placed in position and therefore the cap may be screwed down tight with the assurance that the parts are all properly adjusted. If it should be found that a greater or less pressure is desired within certain limits the threaded member 22 may be unscrewed slightly or screwed up slightly. The end prongs 24 and 25 of the thermostatic member 12 are riveted firmly to the prongs 24 and 25 of the thermostatic member 13, suitable spacing washers 26 and 27 being provided so that the pointed ends 14 of the respective members 12 and 13 will be spaced apart in order that the ends of the rods 11 and 19 may be properly secured in place as shown in Fig. 3.

In operation when the device is used it is arranged as shown in Fig. 1 and as steam is supplied to radiator 3 air is forced therefrom through the inlet member 2, through casing 1 and out through the return pipe 4. The valve and associate parts remain as shown in Fig. 1 during the passage of the air and any water which may be in the radiator. However, as soon as steam begins to pass the thermostatic members 12 and 13 will begin to expand and by reason of their circular structure will provide a maximum expansion, which is multiplied by the number of thermostatic members used, there being two shown in series in Fig. 1. The large valve 6 is first lowered to its seat and then the auxiliary valve member 10 is moved down against its seat whereupon steam cannot pass. The steam pressure may be high or low and the operation is the same. When the heat in the chamber 1 is reduced the thermostatic members will contract and first raise the auxiliary valve 10 whereupon the pressure on the seat of the valve 6 will be equalized, and if the parts remain cool they will continue to contract until the valve has been raised to the position shown in Fig. 1, which will allow the passage of air and even steam until the thermostatic members have been heated to a certain extent. The two thermostatic members 12 and 13, which are in the shape of open cylinders, form substantially a figure 8, as seen in Figs. 1 and 5. The prongs of the forks are joined together as stated, the "handle" of one of the forks being secured to the member 19 and the other "handle" to the member 11, which is connected with the valve. It will be seen that the "handle" of one of these thermostatic members is held from movement, while the "handle" of the other member is movable, due to changes in temperature, in a straight line between the two loops at right angles to the long axis through the two loops of the figure 8 thus formed, so that the control valve or valves will be moved along a tangent to the two loops of the figure 8 by the combined effect of the movement of the two members 12 and 13. It will be understood, of course, that the amount of steam passing is very small, as the particular construction of the respective thermostatic members is such as to provide a sensitive control, allowing water and air to freely pass, but preventing any appreciable amount of steam from passing. The action of the valve and associate parts is assisted by the way the rod 16 is pivotally mounted. This pivotal mounting may be varied somewhat as shown in Fig. 7 to produce if possible a freer action of the parts and automatic adjustment of the valve against its seat when the thermostatic members have been expanded to the necessary extent.

In Fig. 8 a slightly modified form of the invention will be seen in which the thermostatic members 28 and 29 are almost circular, but not quite, with the thermostatic member 29 rigidly secured to the valve member 30 and one end of the thermostatic member curved at 31 for fitting against the curved surface 32. A retaining screw 33 is provided which extends through an aperture 36 slightly larger than the screw 33, so that the curved member 31 may freely move over the curved surface of the supporting fixture 37 in order to allow for a direct pressure against valve 30 when engaging its seat 38. This seat may be integral with the casing 1 or formed independent thereof and secured in position in any desired manner, as for instance by threads.

As a modification to the structure shown in Fig. 1 a structure disclosed in Figs. 10 and 11 may be used wherein four thermostatic members 39 are provided arranged in series so as to produce a greater movement for the valve member 30.

In Figs. 9, 12 and 14 will be seen modified forms of the invention in which balls and sockets are used for causing an automatic adjustment of the parts so that the stress will be in substantially a straight line. In Fig. 9 for instance, the socket 40 accommodates a ball 41 which is secured to the end of the thermostatic member 42 which in turn is secured to thermostatic member 43 carrying a valve member 44. The valve member 44 engages the seat 45 mounted in a suitable frame 46 which also carries the socket member 40. By this construction and arrangement the parts may be adjusted before the cap 47 is placed in position. In Fig. 12 the thermostatic members 48 and 49 are on the same side instead of on the opposite sides as shown in Fig. 9, while in Fig. 14 the thermostatic member 50 carries a socket 51 for accommodating the ball 52 carried by the fixed support 53 which may be secured to the cover 47 or to a supporting frame similar to frame 46 shown in Fig. 9.

In Fig. 13 a modified form of valve seat is shown wherein the valve member 54 is a ball fitting against a tapering seat 55. This shape of seat, as well as the rounded ends of the valve member of the other form of the invention cause a tight connection even through the pressure is slightly off a direct central line through the seat.

It will be noted that certain of the forms of the thermostatic trap disclosed herein have a thermostatic member substantially in the shape of a figure 8 having two ends at the juncture of the two loops, one of these ends being held from movement and the other being free to move, and carrying a controlling member, *i. e.*, a valve.

What I claim is:

1. In a thermostatic trap of the type described, a casing having an inlet and an outlet, a valve for controlling the outlet, a thermostatic member disposed within the casing, and comprising a plurality of substantially circular sections connected in a series, means for connecting the valve with the end of one of the said sections, a supporting member carried by said casing and adjustable toward and away from said outlet, and means for pivotally connecting one of said substantially circular sections to said adjustable supporting member.

2. A thermostatically controlled device comprising a thermostatic element of substantially the shape of a figure 8, and a controlling member secured to the element at the meeting of the two loops thereof operated by the combined effect of the two loops.

3. A thermostatically controlled device comprising a thermostatic element of substantially the shape of a figure 8 having two ends at the juncture of the two loops thereof, means for holding one of said ends from movement due to temperature changes, and a controlling member carried by the other of said ends, the said controlling member moved in response to changes of temperature by the combined effect of the two loops in a straight line between the two loops.

4. A thermostatically controlled device comprising a thermostatic element of substantially the shape of a figure 8, having two connected oppositely disposed loops, the connections between the loops being open at one point at the meeting of the two loops to provide two oppositely directing ends, one of said ends held from movement due to temperature changes, and the other of said ends movable in a straight line between the two loops in response to temperature changes an amount equal to the resultant of the curvilinear movement of the two loops of the element, and a controlling member moved by said other end.

5. A thermostatically controlled device comprising a thermostatic element having two similar thermostatic members, each of said members formed of a strip of thermostatic material in the shape of a fork bent into the shape of an open cylinder with the "handle" of the fork between the prongs thereof, the prongs of the two forks being joined to form two tangentially joined cylinders with the "handles" of the forks opposite each other at the juncture of the cylinders, one of said "handles" held from movement due to changes of temperature, and the other of said "handles" movable tangentially of the two cylinders at the juncture thereof in accordance with changes of temperature by the combined effect of both members, and controlling member secured to said other "handle."

6. A thermostatically controlled valve comprising a thermostatic element of substantially the shape of a figure 8, the said element having two ends at the juncture of the two loops thereof, means for holding one of said ends from movement due to temperature changes, and a valve plug carried by the other end of said element, the said valve plug moved by the combined effect of the two loops of the element in a straight line in accordance with changes of temperature.

REUBEN N. TRANE.